United States Patent
Diederich et al.

(10) Patent No.: US 10,261,871 B2
(45) Date of Patent: Apr. 16, 2019

(54) MODIFICATION OF A CLUSTER OF COMMUNICATION CONTROLLERS

(71) Applicant: International Business Machines Corporation, Armonk, NY (US)

(72) Inventors: Michael Diederich, Mainz (DE); Thorsten Muehge, Mainz (DE); Erik Rueger, Mainz (DE); Ulf Troppens, Mainz (DE); Rainer Wolafka, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 14/508,202

(22) Filed: Oct. 7, 2014

(65) Prior Publication Data

US 2015/0143160 A1   May 21, 2015

(30) Foreign Application Priority Data

Nov. 19, 2013   (GB) .................................. 1320382.3

(51) Int. Cl.
  *G06F 8/65*     (2018.01)
  *G06F 11/20*    (2006.01)
  (Continued)

(52) U.S. Cl.
  CPC ............ *G06F 11/2007* (2013.01); *G06F 8/65* (2013.01); *H04L 41/0668* (2013.01); *H04L 69/40* (2013.01); *H04L 41/0893* (2013.01)

(58) Field of Classification Search
  CPC .... G06F 11/2007; G06F 8/65; H04L 41/0668; H04L 69/40; H04L 41/0893
  See application file for complete search history.

(56) References Cited

U.S. PATENT DOCUMENTS

| 6,629,264 B1 * | 9/2003 | Sicola ................. G06F 11/2007 714/15 |
| 7,340,639 B1 | 3/2008 | Lee et al. |

(Continued)

OTHER PUBLICATIONS

IBM, "IBM System Storage N series with Clustered Failover high-availability solution," printed Oct. 7, 2014, http://public.dhe.ibm.com/common/ssi/ecm/en/tsd01275usen/TSD01275USEN.PDF.

(Continued)

*Primary Examiner* — Patrice L Winder
*Assistant Examiner* — Angela M Widhalm De Rodrig
(74) *Attorney, Agent, or Firm* — The Steadman Law Firm PLLC

(57) ABSTRACT

Provided is a system having a cluster of communication controllers, a method for modification of the latter, and a computer program product carrying computer executable code for execution of the method. Each communication controller is operable for providing network connections of the system with external computer systems using communication protocols of a first type and a second type. The first type is a failover tolerant communication protocol type. The second type is a failover non-tolerant communication protocol type. All network connections of each communication controller are disconnected during the modification of said communication controller. The method for modifying the cluster of communication controllers includes splitting the communication controllers into a first pool and a second pool.

15 Claims, 6 Drawing Sheets

(51) Int. Cl.
*H04L 12/24* (2006.01)
*H04L 29/14* (2006.01)

(56) References Cited

U.S. PATENT DOCUMENTS

| | | | |
|---|---|---|---|
| 7,512,832 B1* | 3/2009 | Lent | G06F 11/2092 |
| | | | 714/4.11 |
| 7,716,323 B2* | 5/2010 | Gole | H04L 29/06 |
| | | | 370/214 |
| 8,151,021 B1 | 4/2012 | Glade et al. | |
| 8,255,898 B2 | 8/2012 | Nakano et al. | |
| 8,438,253 B2* | 5/2013 | Szabo | G06F 8/67 |
| | | | 709/220 |
| 8,856,582 B2* | 10/2014 | George | H04L 67/06 |
| | | | 714/15 |
| 9,015,519 B2* | 4/2015 | Anthonisamy | G06F 11/2005 |
| | | | 709/203 |
| 9,215,279 B1* | 12/2015 | Le | H04L 63/10 |
| 9,361,192 B2* | 6/2016 | Smith | H04L 49/65 |
| 9,405,628 B2* | 8/2016 | Blea | G06F 17/30079 |
| 9,424,324 B2* | 8/2016 | Friese | G06F 17/30265 |
| 2007/0088702 A1* | 4/2007 | Fridella | G06F 17/30123 |
| 2009/0144720 A1 | 6/2009 | Roush et al. | |
| 2010/0042869 A1 | 2/2010 | Szabo et al. | |
| 2010/0162226 A1 | 6/2010 | Borissov et al. | |
| 2010/0313063 A1 | 12/2010 | Venkataraja et al. | |
| 2012/0297243 A1 | 11/2012 | He et al. | |
| 2013/0073717 A1 | 3/2013 | Collin et al. | |

OTHER PUBLICATIONS

IBM, "A Method for Managing Node Failures in a Storage System with Multiple Paths from Clients to Data," IPCOM000012376D, Publication Date May 1, 2003.

Wikipedia, "Network-attached storage," printed Jul. 23, 2014, http://en.wikipedia.org/wiki/Network-attached_storage.

Wikipedia, "Round-robin DNS," printed Jul. 23, 2014, http://en.wikipedia.org/wiki/Round_robin_DNS.

Linux Virtual Server, LVS Introduction—Load Balancing Server Cluster, printed Jul. 23, 2014, http://www.linuxvirtualserver.org/whatis.html.

* cited by examiner

| failover tolerant | | | failover non-tolerant | | |
|---|---|---|---|---|---|
| controller ID/IP | clients | status | controller ID/IP | client | status |
| 1/IP1 | A ,B | old version | 2/IP2 | E, F | old version |
| 3/IP3 | C, D | old version | 4/IP4 | G, H | old version |

300

| failover tolerant | | | failover non-tolerant | | |
|---|---|---|---|---|---|
| controller ID/IP | clients | status | controller ID/IP | client | status |
| 1/IP1 | | upgrade | 2/IP2 | E ,F | old version |
| 3/IP3 | C, D, A, B | old version | 4/IP4 | G, H | old version |

310

| failover tolerant | | | failover non-tolerant | | |
|---|---|---|---|---|---|
| controller ID/IP | clients | status | controller ID/IP | client | status |
| 2/IP2 | E, F | old version | 4/IP4 | G, H | old version |
| 3/IP3 | C, D, A, B | old version | 1/IP1 | | new version |

320

| failover tolerant | | | failover non-tolerant | | |
|---|---|---|---|---|---|
| controller ID/IP | clients | status | controller ID/IP | client | status |
| 2/IP2 | E, F | old version | 4/IP4 | | upgrade |
| 3/IP3 | C, D, A, B | old version | 1/IP1 | G, H | new version |

330

| failover tolerant | | | failover non-tolerant | | |
|---|---|---|---|---|---|
| controller ID/IP | clients | status | controller ID/IP | client | status |
| 2/IP2 | E, F | old version | | | |
| 3/IP3 | C, D, A, B | old version | 4/IP4 | | new version |
| 1/IP1 | G, H | new version | | | |

| failover tolerant | | | failover non-tolerant | | |
|---|---|---|---|---|---|
| controller ID/IP | clients | status | controller ID/IP | client | status |
| 2/IP2 | | upgrade | | | |
| 3/IP3 | C, D, A, B | old version | 4/IP4 | E, F | new version |
| 1/IP1 | G, H | new version | | | |

360

| failover tolerant | | | failover non-tolerant | | |
|---|---|---|---|---|---|
| controller ID/IP | clients | status | controller ID/IP | client | status |
| | | | 2/IP2 | | new version |
| 3/IP3 | C, D, A, B | old version | 4/IP4 | E, F | new version |
| 1/IP1 | G, H | new version | | | |

370

| failover tolerant | | | failover non-tolerant | | |
|---|---|---|---|---|---|
| controller ID/IP | clients | status | controller ID/IP | client | status |
| 3/IP3 | | upgrade | 2/IP2 | | new version |
| 1/IP1 | G, H, C, D, A, B | new version | 4/IP4 | E, F | new version |

380

| failover tolerant | | | failover non-tolerant | | |
|---|---|---|---|---|---|
| controller ID/IP | clients | status | controller ID/IP | client | status |
| 3/IP3 | | new version | 2/IP2 | | new version |
| 1/IP1 | G, H, C, D, A, B | new version | 4/IP4 | E, F | new version |

Fig. 3b

|  | Controller IP | |
| --- | --- | --- |
| Executed process blocks of flowchart on Fig. 4 | First list | Second list |
| 400, 411 | IP1, IP3 | IP2, IP4 |
| 421, 441 | IP1, IP3 | IP1, IP2, IP4 |
| 447, 441 | IP1, IP3 | IP1, IP2, IP3, IP4 |
| 447, 442 | IP1, IP3 | IP1, IP3 |
| 444 | IP1, IP3 | IP1, IP2, IP3 |
| 443, 444 | IP1, IP3 | IP1, IP2, IP3, IP4 |
| 491 | IP1, IP3 | IP2, IP4 |

Fig. 5

MODIFICATION OF A CLUSTER OF COMMUNICATION CONTROLLERS

BACKGROUND

Computer systems equipped with clusters of communication controllers for providing network connections of the computer systems with external computer systems is a well-known computer configuration. For instance, this configuration may be used for storage systems providing data storage/exchange services to external computer systems. In this case, communication controllers provide the network connections of the external computer systems to internal storage media of the storage computers. Upgrade or any other modifications of the communication controllers are very critical for the operation of such computer systems, because these operations cause all network connections provided by the communication controller to be disconnected when such a modification is started. As a result, these network connections have to be reestablished using other communication controllers. Despite rapid development of computer technologies, there are a number of communication protocols/network protocols used for network connections which are not failover tolerant. This means that when the network connection established by the external computer system with the computer system using a failover non-tolerant network protocol is disconnected by the computer system, the external computer system will experience an I/O error. As usual, these I/O errors have to be recovered manually by users of the external computer systems. Thus, maintenance works on the clusters of the communication controllers of such computer systems may cause substantial disturbances in operation of the external computer systems having network connections with the computer systems.

SUMMARY

The present disclosure provides for an improved method for modification of communication controllers of a computer system. It should be appreciated that the present invention can be implemented in numerous ways, including as a process, a method, an apparatus, a system, a device, or a computer program product carrying computer executable code for execution by a processor controlling the apparatus. Several inventive embodiments are described below.

One embodiment of the present invention provides for a method for modification of communication controllers of a computer system. Each communication controller is operable for providing network connections of the computer system with external computer systems using communication protocols of both or one of the following types: a first type and a second type, wherein the first type is a failover tolerant communication protocol type and the second type is a failover non-tolerant communication protocol type. All network connections of each communication controller are disconnected during the modification of said communication controller. Each network connection between the computer system and the external computer system provided by the communication controller using the communication protocol of the second type for said network connection needs to be reestablished by giving a command for reestablishing of said network connection to said external computer system in a case when, as a result of starting the modification of said communication controller which was providing said network connection, said network connection is disconnected by the computer system. Each network connection between the computer system and the external computer system provided by the communication controller using the communication protocol of the first type for said network connection is automatically reestablished in a case when as a result of starting the modification of said communication controller which was providing said network connection, said network connection is disconnected by the computer system, wherein said network connection provided by using the communication protocol of the first type is automatically reestablished by using another communication controller providing the network connections of at least the first type. The method comprises the following.

The communication controllers are split into a first pool and a second pool. The first pool comprises at least one communication controller and the second pool comprises at least another one communication controller. Each communication controller of the first pool provides the network connections using only the communication protocols of the first type. Each communication controller of the second pool provides the network connections using the communication protocols of the second type.

A portion of the communication controllers is modified. The portion of the communication controllers consists of one or more communication controllers of the first pool. In a special case when the portion consists of all communication controllers of the first pool and all controllers of the first portion are modified concurrently, at least one communication controller of the second pool provides the network connections using the communication protocols of both types after the splitting of communication controllers into the first and the second pool and before the modifying of the portion of the communication controllers.

After the modifying of the portion of the communication controllers, a next portion of the not yet modified communication controllers is modified. In a case when the next portion of the not yet modified communication controllers comprises at least one communication controller providing the network connections using the communication protocols of at least the second type, the network connections of the second type are reestablished using only one or more modified controllers providing the network connections of at least the second type. The modifying of the next portion of the not yet modified communication controllers is repeated until all communication controllers are modified. At least one modified communication controller of the first pool provides the network connections using the communication protocols of at least the second type before the next portion of the not yet modified communication controllers comprises the communication controller of the second pool for the first time.

An advantage of this method is that the external computer systems connected to the computer system using the communication protocol of the second type (failover non-tolerant) will experience only one I/O Error due to upgrade of the communication controllers.

Another embodiment of the present invention provides for a program product, in particular a computer readable medium, the computer program product carrying computer executable code for execution by a processor controlling an apparatus for modification of communication controllers of a computer system, wherein the communication controllers provide network connections of the computer system with external computer systems, wherein execution of the instructions causes the processor to perform the method of the embodiment described above.

Yet another embodiment of the present invention provides for a computer system comprising communication controllers for providing network connections of the computer system with external computer systems using communication protocols of both or one of the following types: a first type and a second type. The first type is a failover tolerant communication protocol type and the second type is a failover non-tolerant communication protocol type. All network connections of each communication controller are disconnected during the modification of said communication controller. Each network connection between the computer system and the external computer system provided by the communication controller using the communication protocol of the second type for said network connection needs to be reestablished by giving a command for reestablishing of said network connection to said external computer system in a case when, as a result of starting the modification of said communication controller which was providing said network connection, said network connection is disconnected by the computer system. Each network connection between the computer system and the external computer system provided by the communication controller using the communication protocol of the first type for said network connection is automatically reestablished in a case when as a result of starting the modification of said communication controller which was providing said network connection, said network connection is disconnected by the computer system, wherein said network connection provided by using the communication protocol of the first type is automatically reestablished by using another communication controller providing the network connections of at least the first type. The computer system is operable for performing the following:

splitting the communication controllers into a first pool and a second pool, wherein the first pool comprises at least one communication controller, wherein the second pool comprises at least another one communication controller, wherein each communication controller of the first pool provides the network connections using only the communication protocols of the first type and each communication controller of the second pool provides the network connections using the communication protocols of the second type;

modifying a portion of the communication controllers, wherein the portion of the communication controllers consists of one or more communication controllers of the first pool, wherein in a special case when the portion consists of all communication controllers of the first pool and all controllers of the first portion are being modified concurrently, at least one communication controller of the second pool provides the network connections using the communication protocols of both types after the splitting of communication controllers into the first and the second pool and before the modifying of the portion of the communication controllers; and after the modifying of the portion of the communication controllers, modifying a next portion of the not yet modified communication controllers, wherein in a second case when the next portion of the not yet modified communication controllers comprises at least one communication controller providing the network connections using the communication protocols of the second type, the network connections of the second type are reestablished using only one or more modified controllers providing the network connections of the second type, wherein the modifying of the next portion of the not yet modified communication controllers is repeated until all communication controllers are modified, wherein at least one modified communication controller of the first pool provides the network connections using the communication protocols of at least the second type before the next portion of the not yet modified communication controllers comprises the communication controller of the second pool for the first time.

In yet another embodiment after the modifying of the second pool, the second pool provides the network connections using only communication protocols of the second type.

In yet another embodiment, the communication controllers of the first pool which were providing the network connections using communication protocols of at least the second type at a time when the modifying of the second pool was ended, do not provide the network connections using communication protocols of the second type which were established or reestablished after the time.

In yet another embodiment, the communication controllers are split in the portions in a way that all communication controllers of the first pool are modified before the modifying of the communication controllers of the second pool, wherein each modified controller of the first pool provides the network connections using the communication protocols of both types during modification of the second pool.

In yet another embodiment, the communication controllers of each portion comprising more than one communication controller are sequentially modified when conditions of the special case are not fulfilled.

In yet another embodiment, a portion of the communication protocols of the first type are stateless file-based data protocols. According to such embodiment, each network connection between the computer system and the external computer system provided by the communication controller using the communication protocol of said portion for said network connection is automatically reestablished by said communication protocol in a case when as a result of starting the modification of said communication controller which was providing said network connection, said network connection is disconnected by the computer system.

In yet another embodiment, a portion of the communication protocols of the second type are stateful file-based data protocols.

In yet another embodiment, each communication controller has one or more unique internet protocol (IP) addresses for providing the network connections between the computer system and the external computer systems. The establishing of the network connections between the computer system and the external computer systems upon requests of the external computer systems is managed by one or more domain name system (DNS) servers being operable for:

identifying a type of the communication protocol in the request of the external computer system;

in a case when the identified type is the first type, providing at least one IP address of at least one communication controller to the external computer system, which has sent the request, wherein said communication controller provides the network connections using the communication protocols of at least the first type; and in a case when the identified type is the second type, providing at least one IP address of at least one or more communication controller to the external computer system, which has sent the request, wherein said communication controller provides the network connections using the communication protocols of at least the second type.

In yet another embodiment, each communication controller has one or more unique IP addresses for providing the network connections between the computer system and the external computer systems. The establishing of the network connections between the computer system and the external computer systems upon requests of the external computer systems is managed by the computer system, which is further operable for:

identifying a type of the communication protocol in the request of the external computer system;

in a case when the identified type is the first type, providing at least one IP address of at least one communication controller to the external computer system, which has sent the request, wherein said communication controller provides the network connections using the communication protocols of at least the first type; and in a case when the identified type is the second type, providing at least one IP address of at least one or more communication controller to the external computer system, which has sent the request, wherein said communication controller provides the network connections using the communication protocols of at least the second type.

In yet another embodiment, each communication controller has one or more unique IP addresses for providing the network connections between the computer system and the external computer systems. The establishing of the network connections between the computer system and the external computer systems upon requests of the external computer systems is managed by the computer system via one or DNS servers. The computer system is further operable to cause the one or more DNS servers to perform the following:

identifying a type of the communication protocol in the request of the external computer system;

in a case when the identified type is the first type, providing at least one IP address of at least one communication controller to the external computer system, which has sent the request, wherein said communication controller provides the network connections using the communication protocols of at least the first type; and in a case when the identified type is the second type, providing at least one IP address of at least one or more communication controller to the external computer system, which has sent the request, wherein said communication controller provides the network connections using the communication protocols of at least the second type.

BRIEF DESCRIPTION OF THE DRAWINGS

The present disclosure will be readily understood by the following detailed description in conjunction with the accompanying drawings.

FIG. 3a-b is an example illustrating modifying of communication controllers of a computer system.

FIG. 5 is an example illustrating modifying of communication controllers of a computer system.

DETAILED DESCRIPTION

Figure 1:
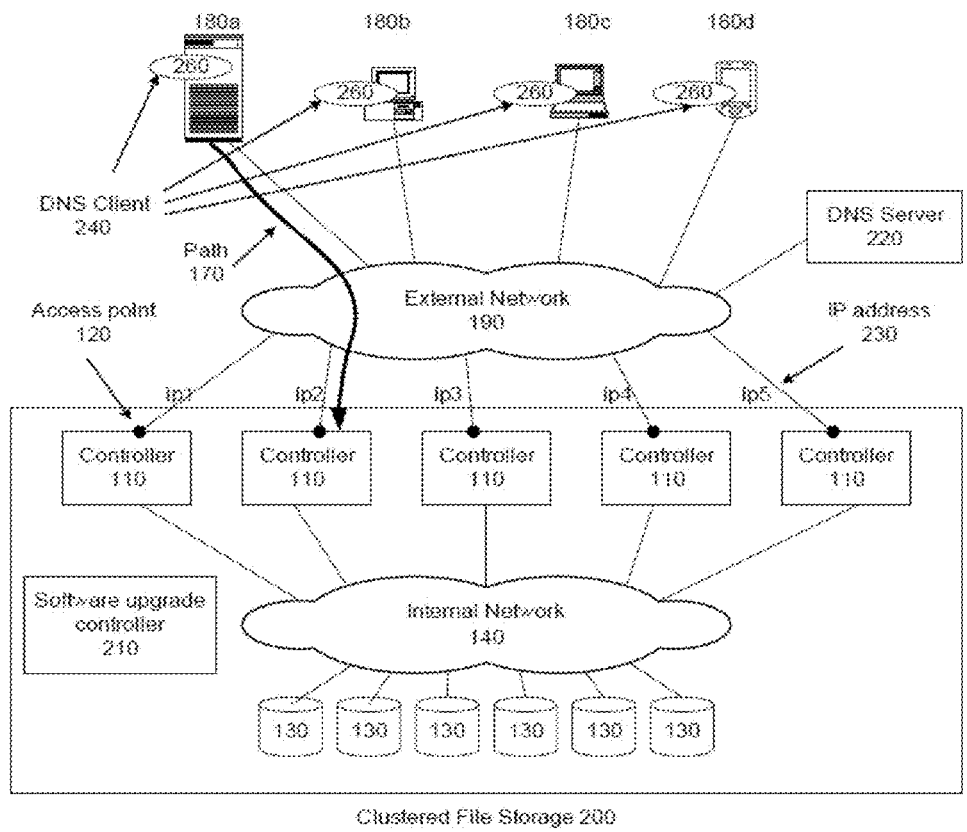
FIG. 1 is a block diagram of a computer system having network connections with external systems.

Modern computer systems consist of various specialized units such as video cards, communication controllers, disks for data storage, processing units, processors, memory of various types, etc. As usual, upgrade or modification any of aforementioned units involves rebooting of a computer system. In a case of personal computer like a laptop, it might cause almost no inconvenience for one or more users of this personal computer, since he or they can perform upgrade/modification in a time frame that he or they can personally determine. This problem becomes more complicated in a case of big computer systems like clustered storage system 200 (FIG. 1). As usual, big computer systems serve a lot of external/internal users and/or internal/external computer systems. Any down time or even underperformance of such computer systems inevitably cause disturbances in operation of external/internal users and/or internal/external computer systems connected to the computer system. Thus, there is a need for procedures/methods enabling modification of the computer systems or components of the computer systems, wherein the downtime of the whole computer systems or their components is minimized or even reduced to zero. In a case when an upgrade/modification of the computer system is performed without shutting it down, it is needed that functionalities of the computer system during its upgrade/modification are not affected or in any case the functionalities are kept at maximum possible level during the upgrade/modification of the computer system. The present invention addresses a problem of upgrade/modification of a cluster of communication controllers 110 of a computer system 200. The communication controllers provide network connections with external computer systems. These network connections may be established by using failover tolerant communication protocols and failover non-tolerant communication protocols. All network connections of each communication controller are disconnected during the modification of said communication controller. The external computer systems connected with the computer system by using failover tolerant communication protocols will not experience I/O errors during upgrade/modification of the communication controllers, since the failover tolerant communication protocols and/or software operating these protocols have a functionality of automatic reestablishing the network connection which was disconnected due to any external event like upgrade/modification of the communication controller. On the other hand, external computer systems connected with the computer system using failover non-tolerant communication protocol will experience I/O error during upgrade of the controller providing network connections with the external communication systems. In particular, the present invention provides a solution for a problem of modification/upgrade of communication controllers providing network connections using failover tolerant and failover non-tolerant communication protocols, wherein the external computer systems 180a-d connected to the computer system 200 during upgrade/modification of the communication controllers experience the least amount of I/O errors. The importance of the aforementioned solution can be illustrated on the "worst case scenario". Suppose the computer system 200 has 5 communication controllers 110. Each communication controller has one access point 120 and each access point has a unique IP 230 ip1-5. Further, the communication controllers are scheduled for an upgrade one by one, according to the following sequence: the communication controller 110 having ip2, the communication controller 110 having ip3, the communication controller 110 having ip4, the communication controller 110 having ip5, and the communication controller 110 having ip1. The computer system 180a is connected to the communication controller having ip2 by a network connection 170 using failover non-tolerant communication protocol. When the upgrade of the communication controller is started, the external system will experience an I/O error. This error may be processed by a user, and a new connection with the computer system may be established. In a case when the network connection is reestablished by using not yet upgraded communication controller, the external computer system 180*a* will experience five I/O errors. In contrast, when the solution of the present invention is used the external computer system would have experienced only one I/O error, because of intelligent orchestration of network connections performed by the computer system 200 itself or by a special controller 210. This orchestration may be executed in conjunction with one or more DNS severs 220 being operable for managing the network connections of the computer system 200 with the external computer systems 180*a-d*.

As will be appreciated by one skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing: In the context of this document, a computer readable storage medium may be any tangible medium that can contain, or store a program for use by or in connection with an instruction execution system, apparatus, or device.

A computer readable signal medium may include a propagated data signal with computer readable program code embodied therein; for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The present invention is of particular advantage when various components of distributed database computer systems are connected through Internet, because one of the benefits of the present invention is reduction of traffic between the components of the distributed database computer system such as for instance storage memories and processors.

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will also be noted that each process block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a storage system 200 providing its internal storage capacity via a network 190 to external computer systems. The storage system 200 comprises two or more communication controllers 110 which present the storage capacity of the computer system 200 via external network 190 to one or more external computer systems 180 (e.g., server 180*a*, personal computer 180*b*, mobile device 180*c*, and smart device 180*d*). Each storage controller 110 can have single or multiple access points 120 to external network 190. The communication/storage controllers 110 store incoming data on internal storage media 130 (e.g., disk drive, tape cartridge, Solid State Disk (SSD), non volatile RAM) via internal network 140 (e.g., Fibre Channel, Transmission Control Protocol/Internet Protocol (TCP/IP), Ethernet, InfiniBand). The storage system 200 can comprise multiple internal storage media 130 and multiple internal networks 140. Computer (storage) systems 200 with more than two controllers 110 are also called clustered (storage) systems. One of examples of the storage system 200 may be a network attached storage (NAS) system.

A connection from the external computer system 180a-d via the network 190 and the access point 120 to the communication/storage controller 110 is called a path 170 from the external computer system 180 to the computer (storage) system 200. So-called multi-pathing software operating can handle multiple redundant paths from external computer system 180a-d to the computer (storage) system 200 where different paths may be connected to different communication/storage controllers 110. The multi-pathing software is a software component which typically runs on the external computer system 180a-d. The multi-pathing software can handle failures of a path 170 and of communication/storage controllers 110. The multi-pathing software enables external computer systems 180 to continue to read, write, update, and delete data which is stored on the computer (storage) system 200, as long as at least one path 170 between the external computer system 180 and storage system 200 is functional. Further multi-pathing software can control and balance data access to the computer (storage) system 200 so that multiple redundant paths 170 are equally loaded.

The multi-pathing software is well established for block-based storage protocols like Small Computer System Interface (SCSI), Fibre Channel and Fibre Connection (FICON) and block based storage systems like disk systems, tape libraries and virtual tape libraries. File-based data protocols like Common Internet File System (CIFS), file transfer protocol (FTP), Network File System (NFS) and Hypertext Transfer Protocol (HTTP) are not multi-pathing capable. Therefore, computer storage systems like Network Attached Storage (NAS) and Unified Storage which support file-based protocols cannot leverage the multi-pathing software, because such software is not available on external computer systems 180a-d which access data via file-level protocols. Consequently, a failure of a path 170 causes at least one I/O error on the external computer system 180.

File-based data protocols are distinguished in stateless and in stateful communication protocols. Stateless communication protocols like NFS and HTTP do not maintain a session context on the server (computer system 200) side. A stateless storage communication protocol treats each I/O request as an independent transaction which is not related to any previous I/O request. If a controller 110 of a (clustered storage) computer system 200 is shut down while it is processing an I/O request, the I/O request times out on external computer system 180a-d and it just resends the same I/O request. If the resent I/O request is redirected to another functional controller 110, then applications on external device 180 continue without any disturbance/interruption.

In contrast, stateful communication protocols like CIFS and FTP maintain a session context. In the case of a communication controller 110 failure/upgrade/modification, a client on the external computer system 180a-d could resend the I/O request, but if the I/O request is redirected to a different controller 110, the accepting different controller 110 has no information on the session context so it will fail to process the resent and redirected I/O request. Consequently, communication (storage) controller 110 failures of the (clustered storage) computer systems 200 cause interruption of operation of the external computer systems 180a-d being connected via the stateful communication protocols. As usual, users of these external computer systems are prompted to deal with these I/O errors manually.

The aforementioned limitations of the stateful communication protocols increase the impact of communication controller 110 maintenance tasks. In particular, the upgrade of a first communication controller 110 may cause an external computer system 180a-d to reconnect to another not yet upgraded communication controller 110, which will be upgraded later on. When upgrade of another not yet upgraded communication controller 110 is started, the external computer systems 180a-d, which were connected to this communication controller might be redirected either to an already upgraded communication controller or yet another one not yet upgraded communication controller. In a worst case scenario, when the clients connected to the computer system 200 by using the stateful communication protocols are always redirected to a not yet upgraded communication controller, these clients will experience a number of I/O errors equal to a number of communication controllers. This number may be quite big, for instance enterprise scale-out NAS systems like IBM SONAS comprise a cluster of several tens of communication controllers 110. When upgrade of this cluster is not managed properly, it may substantially disrupt operation of applications on the external computer systems which are connected via the stateful communication protocols.

The main idea of a solution addressing the aforementioned problem is based on the following assumptions and process blocks. Each communication controller 110 is operable for providing network connections 170 of the computer system 200 with external computer systems 180a-d using communication protocols of both or one of the following types: a first type and a second type, wherein the first type is a failover tolerant communication protocol type and the second type is a failover non-tolerant communication protocol type. All network connections of each communication controller are disconnected during the modification of said communication controller. Each network connection between the computer system and the external computer system provided by the communication controller using the communication protocol of the second type for said network connection needs to be reestablished by giving a command for reestablishing of said network connection to said external computer system in a case when as a result of starting the modification of said communication controller which was providing said network connection, said network connection is disconnected by the computer system. Each network connection between the computer system and the external computer system provided by the communication controller using the communication protocol of the first type for said network connection is automatically reestablished in a case when as a result of starting the modification of said communication controller which was providing said network connection, said network connection is disconnected by the computer system, wherein said network connection provided by using the communication protocol of the first type is automatically reestablished by using another communication controller providing the network connections of at least the first type. A method for modification of the communication controllers 110 of the computer system 200 comprises the following process blocks depicted on the FIG. 2. Execution of this method may be controlled by a dedicated controller 210 of the computer system.

In a process block 400 the communication controllers are split into a first pool and a second pool. Each pool comprises at least one communication controller. In a process block 410, the first pool is caused to provide the network connections using only communication protocols of the first type and the second pool is caused to provide the network connections using communication protocols of the second type. Alternatively, a portion of the second pool or the whole second pool may be caused to provide the network connections using communication protocols of both types at any time. This may be implemented by using one or more DNS servers 220 managing these network connections of the DNS clients 240 on the external computer systems. Each communication controller 110 may have one or more unique IP addresses 230 for providing the network connections between the computer system and the external computer systems. Alternatively, the process block 410 may be supported by functionalities of the computer system 200 in combination with functionalities of the one or more DNS servers as option. The implementation of the process block 410 may require the following functionalities of the computer system and/or the one or more DNS servers: identifying a type of the communication protocol in the request of the external computer system for establishing of the network connection between the computer system 200 and the external computer system 180*a-d*; in a case when the identified type is the first type, providing at least one IP address of at least one communication controller to the external computer system, which has sent the request, wherein said communication controller provides the network connections using the communication protocols of at least the first type; and in a case when the identified type is the second type, providing at least one IP address of at least one or more communication controller to the external computer system, which has sent the request, wherein said communication controller provides the network connections using the communication protocols of at least the second type. A straightforward implementation support of the aforementioned functionalities may be generating a first and a second list of the communication controllers providing the network connections using communication protocols of the first and second type respectively. In a case when the first pool provides the network connections using communication protocols only of the first type and the second pool provides the network connections using communication protocols only of the second type, the first list consists of all IPs of all communication controllers of the first pool and as option of all unique identification numbers of all communication controllers of the first pool, whereas the second list consists of all IP(s) of all communication controllers of the first pool and as option of all unique identification numbers of all communication controllers of the second pool. In a case when the communication controller provides the network connections using communication protocols of both types, then all of its IP addresses and as option its unique identification are listed in both lists. The one or more DNS servers may provide the network connections between the computer system and the external computer systems according to these lists. Sorting of the communication protocols into two types and splitting the communication controllers into two pools may be a first time installation step of the computer system 200.

As it will be clearly seen from further description of the method, the sorting of communication protocols and splitting of the communication controllers allows optimization of communication controller upgrade/modification in a way that impact of the upgrade/modification on connected DNS clients is minimized. In particular, the DNS clients/external computer systems using the communication protocols of the second type for the network connections with the computer systems will experience not more than one failover during upgrade/modification of the communication controllers. This solution is of particular importance for large clusters of the communication controllers where a number of failovers will be significantly bigger if the currently described method is not used. For instance, utilization of round-robin approach for managing the network connections between the computer system and the external computer systems being not combined with essential elements of here described method will cause a lot of unnecessary failovers during upgrade/modification of the communication controllers. In return, the big mount of these unnecessary failovers may cause a disruption in operation of the external computer systems having network connections established by using the communication protocol of the second type.

Figure 2:
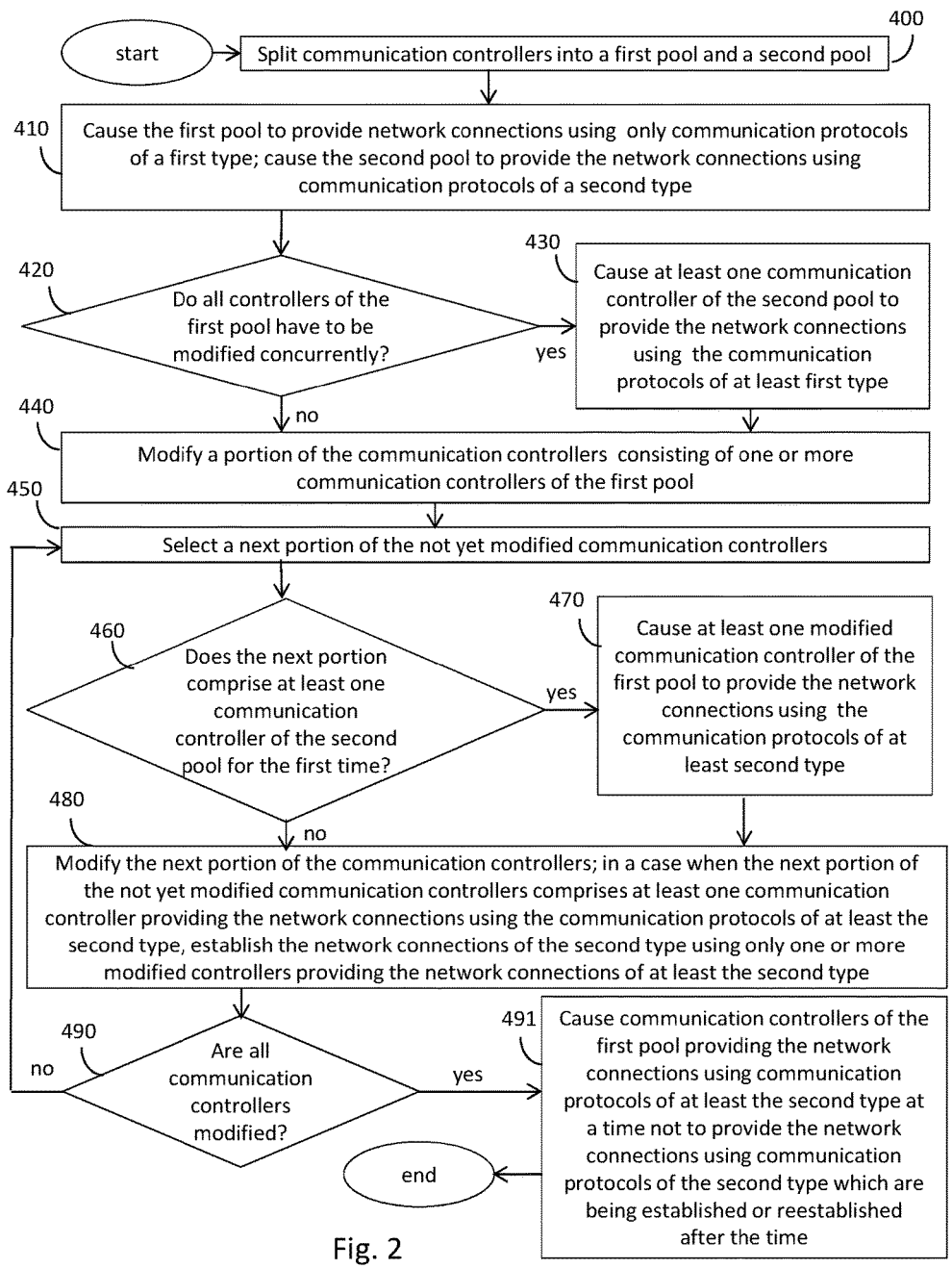
FIG. 2 is a flowchart of process blocks for modifying of communication controllers of a computer system.

FIG. 3*a* and FIG. 3*b* illustrate an example case, wherein the flowchart of the method illustrated on FIG. 2 is applied for a modification of a cluster of 4 communication controllers of the computer system. Although the flowchart of the method depicted on FIG. 2 does not have the following constraints, the following constraints are applied in the example case depicted on FIG. 3*a-b* in order to make it less complicated and more illustrative. Communication controllers 1-4 provide the network connections using the communication protocols only of one type. Only the DNS clients, who had the network connections with the computer system before the upgrade/modification of the cluster are illustrated. Moreover the DNS clients depicted on the FIG. 3*a-b* request the network connections using protocols of the same type throughout execution of the modification/upgrade. Those skilled in the art will clearly understand that other DNS clients may connect, disconnect, or request the network connections using the communication protocols of different types throughout execution of the modification/upgrade without experiencing any additional network connection disruptions in comparison with the DNS clients depicted on the FIG. 3*a-b*. The communication controllers are modified/upgraded one by one. Table 300 illustrates the state of the cluster after the execution of the process blocks 400 and 410. The first controller has an IP1 and provides the network connections with the DNS clients A and B using the communication protocols of the first type. The second controller has an IP2 and provides the network connections with the DNS clients E and F using the communication protocols of the second type. The third controller has an IP3 and provides the network connections with the DNS clients C and D using the communication protocols of the first type. The fourth controller has an IP4 and provides the network connections with the DNS clients G and H using the communication protocols of the second type.

In order to manage the network connections between the computer system and the external computers system the one or more DNS servers may be provided with the first and the second list. The first list consists of the IP1 and the IP3, further it may consist of the respective unique identifications of the first and third communication controllers (column "controller ID/IP" in the "failover tolerant" section in the table 300 of FIG. 3*a*). The second list consists of the IP2 and the IP4, further it may consist of the respective unique identifications of the second and fourth communication controllers (column "controller ID/IP" in the "failover non-tolerant" section in the table 300 of FIG. 3*a*).

In a process block 420 it is determined whether occurrence of a dead-lock situation during upgrade of controller is possible. This dead lock situation is characterized by the following conditions. All communication controllers of the first pool are upgraded/modified in a way that all of them do not provide the network connections at a time. The second pool provides network connections by using the connection protocols only of the second type. Thus, at the time there are no communication controllers providing the network connections using the communication protocols of the first type; i.e., there are no communication controllers to provide failover for the external computer systems connected with the computer system using the communication protocols of the first type. The conditions for this dead-lock situation are not fulfilled in the example case depicted on the FIG. 3*a-b*, because all communication controllers are upgraded/modified one by one, and there is more than one communication controller providing network connections by using communication protocols of the first type.

In a case when the occurrence of the dead-lock situation is possible, then in order to avoid the dead-lock situation a process block 430 is performed. At least one communication controller of the second pool is caused to provide the network connections using the communication protocols of at least the first type.

In a process block 440, a portion of the communication controllers is upgraded/modified. A number of the communication controllers in the portion is arbitrary. The portion consists only of one or more controllers of the first pool. Other communication controllers providing the network connections using the communication protocols of at least the first type are used for providing failover for the network connections disconnected due to upgrade/modification of the portion. Table 310 on the FIG. 3*a* illustrates execution of this process block. The first controller has no DNS clients. Its status is changed for upgrade and its IP is removed from the first list during its upgrade/modification. The network connections of the DNS clients A and B are provided by the third communication controller. The table 320 illustrates the state of the cluster when the process block 440 is completed. Since the flow chart of the method on FIG. 2 is formulated in a very broad sense and only premise process blocks are included, the following first additional process block is executed in the example case without going beyond the flowchart diagram of the FIG. 2 in order to make the example case more illustrative. The first controller is caused to provide the network connections using the communication protocols only of the second type after its upgrade/modification, afterwards the second communication controller is caused not to provide the newly established or reestablished network connections using the communication protocols of the second type. That is why the second communication controller is listed in the "failover tolerant" section of the Table 320, while providing network connections using communication protocols of the second type for the DNS clients E and F. The change in functionalities of the second communication controller may serve a purpose of proper distribution of workload between the communication controllers of the cluster.

As a result of execution of the process block 440 and the first additional process block the first list consists of the IP2 and the IP3, further it may consist of the respective unique identifications of the second and third communication controllers (column "controller ID/IP" in the "failover tolerant" section in the table 320 of the FIG. 3*a*), and the second list consists of the IP1 and the IP4, further it may consist of the respective unique identifications of the first and fourth communication controllers (column "controller ID/IP" in the "failover non-tolerant" section in the table 320 of the FIG. 3*a*).

In process blocks 450, 460, 470, 480, and 490, the rest of the communication controllers are upgraded/modified in at least one portion. In a process block 450, a next portion of the not yet modified/upgraded communication controllers is selected. Since the next portion may comprise one or more communication controllers of the second pool, it is necessary to avoid a problem situation when the next portion comprises at least one communication controller of the second pool for the first time and no modified/upgraded communication controllers provide the network connections using the communication protocols of the second type. If the occurrence of this problem situation is not prevented, it may result in more than one failover of the DNS clients connected to the computer system using the communication protocols of the second type or in even a dead-lock situation when no communication controllers provide the network connections using the communication protocols of the second type when the second pool is disabled for the modification/upgrade. In order to avoid the occurrence of the aforementioned problem situation, it is controlled in the process block 460 whether the next portion comprises at least one communication controller of the second pool for the first time. If yes, the process block 470 is performed in order to avoid the occurrence of the problem situation. At least one modified communication controller of the first pool is caused to provide the network connections using the communication protocols of at least the second type. After execution of the process block 470 or in a case of determination in the process block 460 that the problem situation will not occur the process block 480 is executed, wherein the next portion of the communication controllers is upgraded/modified. In a case when as a result of upgrade/modification of the next portion, one or more network connections established using the communication protocols of the second type are disconnected, all disconnected network connections established using the communication protocols of the second type are reestablished using only one or more modified/upgraded controllers providing the network connections of at least the second type. In a case when as a result of upgrade/modification of the next portion, one or more network connections established using the communication protocols of the first type are disconnected, all disconnected network connections established using the communication protocols of the first type are reestablished using one or more controllers providing the network connections of at least the second type independent of their upgrade/modification state. In a case when the next portion does not comprise all not yet upgraded/modified communication controllers, the process block 490 loops iteration execution of the process blocks 450, 460, 470, 480, and 490 until all communication controllers are upgraded/modified.

The tables 330 and 340 illustrate execution of a first iteration comprising the process blocks 450, 460, and 480. The process block 470 is not executed, because the first controller is already upgraded and provides the network connections using the communication protocols of the second type. The fourth controller is selected in the next portion of the not yet modified controllers in the process block 450. This selection is not determined by the flowchart depicted on the FIG. 2 and does not go beyond this flowchart. The fourth controller is selected in the process block 450 in order to make the example depicted on the FIG. 3*a-b* more illustrative. Table 330 illustrates that the fourth controller does not have any DNS clients during its upgrade/modification. Its IP is removed from the second list during its upgrade/modification. The network connections of the DNS clients G and H are reestablished using the first communication controller, which is already upgraded/modified and provides the network connections using the communication protocols of the second type as required in a description of the process block 480. The table 340 illustrates execution of a second additional process block, wherein the first communication controller is caused to provide the network connections using the communication protocols only of the first type after the upgrade/modification of the fourth communication controller is completed. That is why the second controller is listed in the "failover tolerant" section of the Table 320, while providing network connections using the communication protocols of the second type for the DNS clients G and H. The second additional process block is not determined by the flowchart depicted on the FIG. 2, on the other hand it does not go beyond this flowchart. The second additional process block is executed in order to make the example depicted on the FIG. 3*a-b* more illustrative.

As a result of execution of the process block 480 and the second additional process block in the first iteration the first list consists of the IP1, IP2, and IP3, further it may consist of the respective unique identifications of the first, second, and third communication controller (column "controller ID/IP" in the "failover tolerant" section in the table 340 of the FIG. 3*a*), and the second list consists of the IP4, further it may consist of the respective unique identifications of the fourth communication controller (column "controller ID/IP" in the "failover non-tolerant" section in the table 310 of the FIG. 3*a*).

Since not all communication controllers are upgraded/modified yet, the process block 490 causes execution of a second iteration of the process blocks 450, 460, and 480. Tables 350 and 360 illustrate execution of the second iteration of the process blocks 450, 460, and 480. The process block 470 is not executed, because the fourth controller is already upgraded and provides the network connections using the communication protocols of the second type. The second controller is selected in the next portion of the not yet modified controllers in the process block 450. This selection is not determined by the flowchart depicted on the FIG. 2 and does not go beyond this flowchart. The second controller is selected in the process block 450 in order to make the example depicted on the FIG. 3*a-b* more illustrative. Table 350 illustrates that the second controller does not have any DNS clients during its upgrade/modification. Its IP is removed from the first list during its upgrade/modification. The network connections of the DNS clients E and F are reestablished using the fourth communication controller, which is already upgraded/modified and provides the network connections using the communication protocols of the first type. This change is in accordance with the requirements in the description of the process block 480. The table 360 illustrates execution of a third additional process block, wherein the second communication controller is caused to provide the network connections using the communication protocols only of the second type after the upgrade/modification of the second communication controller is completed. That is why the second controller is listed in the "failover non-tolerant" section of the Table 360. The third additional process block is not determined by the flowchart depicted on the FIG. 2, on the other hand it does not go beyond this flowchart. The third additional process block is executed in order to make the example depicted on the FIG. 3*a-b* more illustrative.

As a result of execution of the process block 480 and the third additional process block in the second iteration, the first list consists of the IP1 and the IP3 (column "controller ID/IP" in the "failover tolerant" section in the table 360 of the FIG. 3*b*), further it may consist of the respective unique identifications of the first and the third communication controller, and the second list consists of the IP4 and the IP2, further it may consist of the respective unique identifications of the fourth and the second communication controller (column "controller ID/IP" in the "failover non-tolerant" section in the table 360 of the FIG. 3*b*).

Since not all communication controllers are upgraded/modified yet, the process block 490 causes execution of a third/last iteration of the process blocks 450, 460, and 480. The tables 370 and 380 illustrate execution of the third iteration of the process blocks 450, 460, and 480. The process block 470 is not executed, because the fourth and the second controller are already upgraded and provide the network connections using the communication protocols of the second type. The third controller is selected in the next portion of the not yet modified controllers in the process block 450, because it is the last not yet upgraded/modified communication controller. Table 370 illustrates that the third controller does not have any DNS clients during upgrade. Its IP is removed from the first list during its upgrade/modification. The network connections of the DNS clients A, B, C, and D are reestablished using the first communication controller, which is already upgraded/modified and provides the network connections using the communication protocols of the first type. This change is in accordance with the requirements in the description of the process block 480. The table 380 illustrates execution of a fourth additional process block, wherein the third communication controller is caused to provide the network connections using the communication protocols only of the first type after the upgrade/modification of the third communication controller is completed. That is why the third controller is listed in the "failover tolerant" section of the Table 380. The fourth additional process block is not determined by the flowchart depicted on the FIG. 2, on the other hand it does not go beyond this flowchart. The fourth additional process block is executed in order to make the example depicted on the FIG. 3*a-b* more illustrative.

As a result of execution of the process block 480 and the fourth additional process block in the third iteration the first list consists of the IP1 and the IP3 (column "controller ID/IP" in the "failover tolerant" section in the table 380 of the FIG. 3*b*), further it may consist of the respective unique identifications of the first and the third communication controller, and the second list consists of the IP4 and the IP2, further it may consist of the respective unique identifications of the fourth and the second communication controller (column "controller ID/IP" in the "failover tolerant" section in the table 380 of the FIG. 3*b*).

Turning back to the flowchart depicted on the FIG. 2, a process block 491 is performed when in the process block 490 it is determined that all communication controllers are upgraded/modified. Execution of the process block 491 is optional since all communication controllers are upgraded/modified; i.e., an objective of the method is achieved. Nevertheless, execution of the process block 491 may be important in a case when the method has to be repeated again, when another upgrade/modification of the communication controllers is needed or scheduled. The process block 491 tends to return the cluster into the state which was achieved after execution of the process blocks 400 and 410; i.e., further execution of the subsequent process blocks of the flowchart depicted on the FIG. 2 is possible. In the process, block 491 the communication controllers of the first pool providing the network connections using communication protocols of at least the second type at a time when the upgrade/modification of all communication controllers is finished, are caused not to provide the network connections using communication protocols of the second type which are being established or reestablished after the time.

Turning back to the described above example case depicted on the FIG. 3a-b, execution of the process block 491 is not needed because it was already effectively executed by executing the second and the forth additional process blocks. However, without going beyond the flowchart depicted on the FIG. 2, the second and the fourth additional process blocks may be executed in a different way, for instance the first and the third communication controllers may be caused to provide the network connections using communication protocols of both types. In this case, execution of the process block 491 is needed in order to enable another upgrade/modification of the communication controllers according to the flowchart depicted on the FIG. 2.

As a concluding remark illustrating the example case depicted on the FIG. 3a-b, it is necessary to mention that each of the DNS clients E, F, G, and H connected to the computer system using communication protocols of the second type has experienced only one failover. The network connections of the DNS clients G and H were reestablished by using the first communication controller, and the network connections of the DNS clients E and F were reestablished by using the fourth communication controller.

As it is already mentioned above, the flowchart depicted on the FIG. 2 illustrates only the premise process blocks of the method. It has a lot of freedom for building executable upgrade/modification schemes. For instance, all communication controllers may be split in any arbitrary number of portions bigger not less than two and not more than a number of the communication controllers. Moreover, the communication controllers of each portion comprising more than one communication controller may be upgraded/modified using any time schedule. For instance, it may by a concurrent or one by one modification/upgrade or any arbitrary combination thereof. On top of this, the flowchart depicted on the FIG. 2 enables modification of the communication controllers pool by pool; i.e., the communication controllers of the second pool may be upgraded/modified after the upgrade/modification of the communication controllers of the first pool.

A portion of the communication protocols of the first type may be stateless file-based data protocols. Each network connection between the computer system and the external computer system provided by the communication controller using the communication protocol of said portion for said network connection is automatically reestablished by said communication protocol in a case when as a result of starting the modification of said communication controller which was providing said network connection, said network connection is disconnected by the computer system.

A portion of the communication protocols of the second type may be stateful file-based data protocols.

The term upgrade/modification should be interpreted in the broadest sense in a context of the present invention. For instance, it may mean software modifications or software upgrades of the communication controllers. Alternatively, it may mean any hardware modifications of the communication controllers up to replacement of entire controllers with the new ones. Further, the interpretation of the term upgrade/modification includes any combination of software and hardware modifications of the communication controllers.

Figure 4:
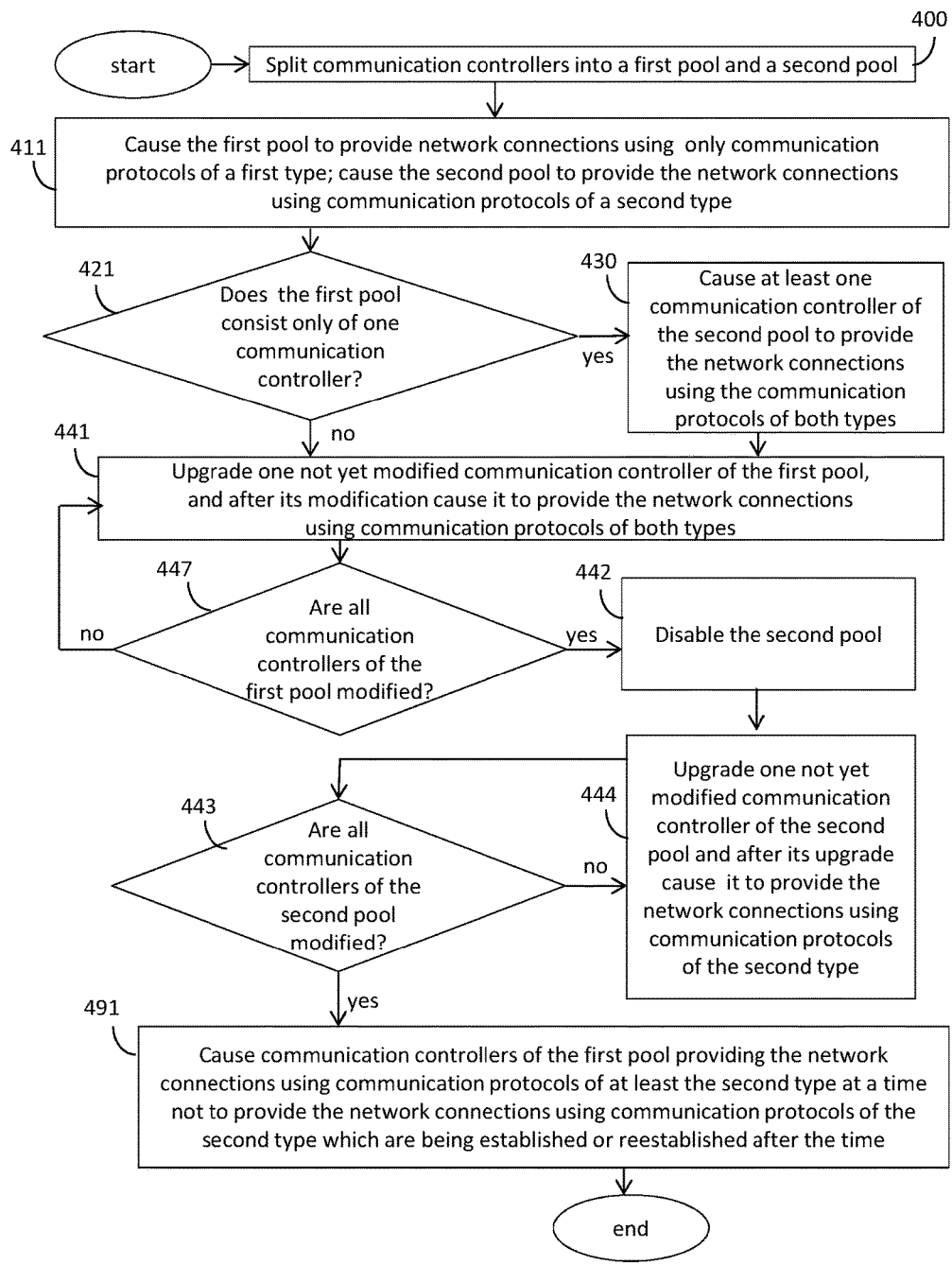
FIG. 4 is a fragment of a flowchart of process blocks for modifying of communication controllers of a computer system.

FIG. 4 illustrates another flowchart for upgrade/modification of the communication controllers of the computer system. In contrast to previously discussed flowchart depicted on the FIG. 2, a sequence of the modification/upgrade of the first and the second pool is determined.

The flowchart depicted on the FIG. 4 may be performed by an upgrade controller of the computer system being operable for: providing novel operating code of the communication controllers, instructing code update modules of the computer system to perform operating code update of one or more communication controllers, providing a first and a second list to one or more DNS servers managing the network connections between the computer system and the external computer systems. Each communication controller has one or more unique IP addresses for providing the network connections. The first list comprises the IP addresses of the communication controllers providing the network connections using communication protocols of at least the first type and the second list comprises IP addresses of the communication controllers providing the network connections using the communication protocols of at least the second type. In a case when the communication controller provides the network connections using the communication protocols of both types, then both lists comprise all IP addresses of said communication controller.

In a process block 400 of the flowchart depicted on the FIG. 4, the communication controllers are split into a first and second pool.

In a process block 411, the first pool is caused to provide the network connections using the communication protocols only of the first type and the second pool is caused to provide the network connections using the communication protocols only of the second type.

FIG. 5 illustrates another example case of upgrading of operating software of communication controllers of a computer system. In this example, the computer system comprises a cluster of 4 communication controllers. Each controller has one unique IP: IP1, IP2, IP3, and IP4.

In order to make this example case more illustrative, the communication controllers are split into two pools in the process block 400. The communication controllers of a first pool have IP1 and IP3 and the communication controllers of the second pool have IP2 and IP4. After execution of the process blocks 400 and 401, the first list consists of IP1 and IP3 and the second list consists of IP2 and IP4.

In a decision process block 421, a possibility of occurrence of a dead-lock situation is checked. The dead-lock situation occurs when the first pool consists only of one controller. Code update of this controller will cause a disturbance of all external computer systems having network connections with the computer system using the communication protocols of the first type, because during the code update of this controller, the network connections of said external computer systems will be disconnected and no other communication controller will be operable for providing failover of said network connections.

In case when the possibility of the occurrence of the dead-lock situation is detected in the decision process block 421, a process block 430 is executed. In the process block, at least one communication controller of the second pool is caused to provide the network connections using the communication protocols of both types. In this case, the aforementioned dead-lock situation is avoided.

In a case when the possibility of the occurrence of the dead-lock situation is not detected in the process block 421 or after execution of the process block 430, a process block 441 is executed. In the process block 441, the operating code of one of the not yet updated communication controllers of the first pool is updated and after the update of the operating code, it is caused to provide the network connections using the communication protocols of both types. Other communication controllers providing the network connections using the communication protocols of the first type are used for providing failover of the network connections which where disconnected due to operating code update of said communication controller of the first pool.

Turning back the example case depicted on the FIG. 5, further processing of the example case will be performed by executing of the process blocks 421 and 441. The process block 430 will not be executed because the first pool consists of two communication controllers. Since in the process block 441 no specific communication controller, which operating code is to be updated first, is specified, the communication controller having IP1 is selected for the operating code update. After execution of the process blocks 421 and 441, the first list consists of IP1 and IP3 and the second list consists of IP1, IP2, and IP4. The communication controller having IP3 is used for providing failover of the network connections which where disconnected due to operating code update of the communication controller having IP1.

A process block 447 loops execution of the process block 441 until all communication controllers of the first pool are updated with the new operating code.

In the example case, the process block 447 cause only single repetition of execution of the process block 441. As a result thereof, the last communication controller of the first pool, which operating code was not yet updated, is selected for the operating code update and the operating code update is performed on said communication controller. After execution of the process blocks 447 and 441, the first list consists of IP1 and IP3 and the second list consists of IP1, IP2, IP3, and IP4.

When the operating code update is performed on all communication controllers of the first pool, the process block 447 causes execution of a process block 442. In the process block 442, all communication controllers of the second pool are disabled. All network connections disconnected as a result of disabling of the second pool are reestablished using the first pool.

As a result of execution of the process blocks 447 and 442 in the example case, the first list consists of IP1 and IP3 and the second list consists of IP1 and IP3. All network connections disconnected as a result of disabling of the second pool are reestablished using the first pool.

In a process block 444, the operating code of one of the not yet updated communication controllers of the second pool is updated and, after the update of the operating code, it is caused to provide the network connections using the communication protocols of the second type.

Execution of the process block 444 in the example case results in operating code update of one of the not yet updated communication controllers of the second pool. Since in the process block 444 no specific communication controller, which operating code is to be updated first, is specified, the communication controller having IP2 is selected for the operating code update. After execution of the process block 444, the first list consists of IP1 and IP3 and the second list consists of IP1, IP2, and IP3.

A process block 443 loops execution of the process block 444 until all communication controllers of the second pool are updated with the new operating code.

In the example case, the process block 443 causes only single repetition of execution of the process block 444. As a result thereof, the last communication controller of the second pool, which operating code was not yet updated is selected for the operating code update and the operating code update is performed on said communication controller. After execution of the process blocks 443 and 444, the first list consists of IP1 and IP3 and the second list consists of IP1, IP2, IP3, and IP4.

A process block 491 of the flowchart depicted on the FIG. 4 is the same as the process block 491 of the flowchart depicted on the FIG. 2.

After execution of the process block 491, the first list consists of IP1 and IP3 and the second list consists of IP2 and IP4.

The invention claimed is:

1. A method of modifying communication controllers of a clustered storage system, wherein each communication controller of the clustered storage system is communicatively located between at least one external network and at least one internal storage system network and includes a unique access point for communication with the at least one external network, the method comprising:

splitting the communication controllers of the clustered storage system into a first pool comprising at least one communication controller and a second pool comprising at least another one communication controller, wherein each communication controller of the clustered storage system is operable to provide network connections with external computer systems via only the at least one external network, wherein each communication controller of the clustered storage system is operable to establish the network connections such that the external computer systems are connected with the clustered storage system using communication protocols of one or both of a first type and a second type, wherein the first type is a failover tolerant communication protocol type and the second type is a failover non-tolerant communication protocol type, wherein each network connection provided by a communication controller using a communication protocol of the first type that is disconnected during communication controller modification is automatically reestablished, wherein each network connection provided by a communication controller using a communication protocol of the second type that is disconnected during communication controller modification is reestablished via a reestablishment command, wherein initially each communication controller of the first pool provides the network connections with the external computer systems using only communication protocols of the first type, and wherein initially each communication controller of the second pool provides the network connections with the external computer systems using communication protocols of the second type;

modifying a portion of the communication controllers of the clustered storage system consisting of one or more communication controllers of the first pool, wherein modifying the portion of the communication controllers comprises temporarily transferring from the first pool to the second pool at least one modified controller providing the network connections with the external computer systems using communication protocols of at least the second type, and wherein in a case when the portion of the communication controllers consists of all of the communication controllers of the first pool and all of the communication controllers of the first pool are modified concurrently, at least one communication controller of the second pool provides the network connections with the external computer systems using communication protocols of at least the first type; and after modifying the portion of the communication controllers, modifying at least one next portion of the communication controllers until all of the communication controllers of the clustered storage system are modified, wherein in a case when the at least one next portion of the communication controllers comprises at least one communication controller providing the network connections with the external computer systems using communication protocols of at least the second type, the network connections of the second type are reestablished using only one or more modified controllers providing the network connections with the external computer systems using communication protocols of at least the second type.

2. The method of claim 1, wherein at least one communication controller of the second pool provides the network connections with the external computer systems using communication protocols of both the first type and the second type.

3. The method of claim 1, wherein after modifying all of the communication controllers of the second pool, the second pool provides the network connections with the external computer systems using communication protocols of the second type as initially provided.

4. The method of claim 1, further comprising, following modification of all of the communication controllers of the clustered storage system, causing the communication controllers of the first pool providing the network connections with the external computer systems using communication protocols of at least the second type to cease providing the network connections with the external computer systems using communication protocols of the second type.

5. The method of claim 1, wherein all of the communication controllers of the first pool are modified before the communication controllers of the second pool, and wherein each modified controller of the first pool provides the network connections with the external computer systems using communication protocols of both the first type and the second type during modification of the second pool.

6. The method of claim 1, wherein a portion of the communication protocols of the first type are stateless file-based data protocols.

7. The method of claim 1, wherein a portion of the communication protocols of the second type are stateful file-based data protocols.

8. The method of claim 1, wherein each communication controller has one or more unique internet protocol (IP) addresses for providing the network connections between the clustered storage system and the external computer systems, and wherein establishing the network connections between the clustered storage system and the external computer systems upon requests of the external computer systems is managed by one or more domain name system (DNS) servers operable to:
identify a type of communication protocol in a request of an external computer system;
in a case when the identified type is the first type, provide at least one IP address of at least one communication controller to the requesting external computer system, wherein the at least one communication controller provides the network connections with the external computer systems using communication protocols of at least the first type; and
in a case when the identified type is the second type, provide at least one IP address of at least one communication controller to the requesting external computer system, wherein the at least one communication controller provides the network connections with the external computer systems using communication protocols of at least the second type.

9. A clustered storage system comprising communication controllers, wherein each communication controller of the clustered storage system is communicatively located between at least one external network and at least one internal storage system network and includes a unique access point for communication with the at least one external network, the clustered storage system being operable for:
splitting the communication controllers of the clustered storage system into a first pool comprising at least one communication controller and a second pool comprising at least another one communication controller, wherein each communication controller of the clustered storage system is operable to provide network connections with external computer systems via only the at least one external network, wherein each communication controller of the clustered storage system is operable to establish the network connections such that the external computer systems are connected with the clustered storage system using communication protocols of one or both of a first type and a second type, wherein the first type is a failover tolerant communication protocol type and the second type is a failover non-tolerant communication protocol type, wherein each network connection provided by a communication controller using a communication protocol of the first type that is disconnected during communication controller modification is automatically reestablished, wherein each network connection provided by a communication controller using a communication protocol of the second type that is disconnected during communication controller modification is reestablished via a reestablishment command, wherein initially each communication controller of the first pool provides the network connections with the external computer systems using only communication protocols of the first type, and wherein initially each communication controller of the second pool provides the network connections with the external computer systems using communication protocols of the second type;
modifying a portion of the communication controllers of the clustered storage system consisting of one or more communication controllers of the first pool, wherein modifying the portion of the communication controllers comprises temporarily transferring from the first pool to the second pool at least one modified controller providing the network connections with the external computer systems using communication protocols of at least the second type, and wherein in a case when the portion of the communication controllers consists of all of the communication controllers of the first pool and all of the communication controllers of the first pool are modified concurrently, at least one communication controller of the second pool provides the network connections with the external computer systems using communication protocols of at least the first type; and
after modifying the portion of the communication controllers, modifying at least one next portion of the communication controllers until all of the communication controllers of the clustered storage system are modified, wherein in a case when the at least one next portion of the communication controllers comprises at least one communication controller providing the network connections with the external computer systems using communication protocols of the second type, the network connections of the second type are reestablished using only one or more modified controllers providing the network connections with the external computer systems using communication protocols of at least the second type.

10. The clustered storage system of claim 9, wherein after modifying all of the communication controllers of the second pool, the second pool provides the network connections with the external computer systems using communication protocols of the second type as initially provided.

11. The clustered storage system of claim 9, wherein the clustered storage system is further operable for, following modification of all of the communication controllers of the clustered storage system, causing the communication controllers of the first pool providing the network connections with the external computer systems using communication protocols of at least the second type to cease providing the network connections with the external computer systems using communication protocols of the second type.

12. The clustered storage system of claim 9, wherein each communication controller has one or more unique internet protocol (IP) addresses for providing the network connections between the clustered storage system and the external computer systems, and wherein establishing the network connections between the clustered storage system and the external computer systems upon requests of the external computer systems is managed by the clustered storage system via one or more domain name system (DNS) servers operable to:
 identify a type of communication protocol in a request of an external computer system;
 in a case when the identified type is the first type, provide at least one IP address of at least one communication controller to the requesting external computer system, wherein the at least one communication controller provides the network connections with the external computer systems using communication protocols of at least the first type; and
 in a case when the identified type is the second type, provide at least one IP address of at least one communication controller to the requesting external computer system, wherein the at least one communication controller provides the network connections with the external computer systems using communication protocols of at least the second type.

13. A computer program product for modification of communication controllers of a clustered storage system, wherein each communication controller of the clustered storage system is communicatively located between at least one external network and at least one internal storage system network and includes a unique access point for communication with the at least one external network, and wherein the computer program product comprises a computer readable storage medium having computer readable program code embodied therewith, the computer readable program code comprising computer readable program code configured to:
 split the communication controllers of the clustered storage system into a first pool comprising at least one communication controller and a second pool comprising at least another one communication controller, wherein each communication controller of the clustered storage system is operable to provide network connections with external computer systems via only the at least one external network, wherein each communication controller of the clustered storage system is operable to establish the network connections such that the external computer systems are connected with the clustered storage system using communication protocols of one or both of a first type and a second type, wherein the first type is a failover tolerant communication protocol type and the second type is a failover non-tolerant communication protocol type, wherein each network connection provided by a communication controller using a communication protocol of the first type that is disconnected during communication controller modification is automatically reestablished, wherein each network connection provided by a communication controller using a communication protocol of the second type that is disconnected during communication controller modification is reestablished via a reestablishment command, wherein initially each communication controller of the first pool provides the network connections with the external computer systems using only communication protocols of the first type, and wherein initially each communication controller of the second pool provides the network connections with the external computer systems using communication protocols of the second type;
 modify a portion of the communication controllers of the clustered storage system-consisting of one or more communication controllers of the first pool, wherein modifying the portion of the communication controllers comprises temporarily transferring from the first pool to the second pool at least one modified controller providing the network connections with the external computer systems using communication protocols of at least the second type, and wherein in a case when the portion of the communication controllers consists of all of the communication controllers of the first pool and all of the communication controllers of the first pool are modified concurrently, at least one communication controller of the second pool provides the network connections with the external computer systems using communication protocols of at least the first type; and
 after modifying the portion of the communication controllers, modify at least one next portion of the communication controllers until all of the communication controllers of the clustered storage system are modified, wherein in a case when the at least one next portion of the communication controllers comprises at least one communication controller providing the network connections with the external computer systems using communication protocols of at least the second type, the network connections of the second type are reestablished using only one or more modified controllers providing the network connections with the external computer systems using communication protocols of at least the second type.

14. The clustered storage system of claim 9, wherein at least one communication controller of the second pool provides the network connections with the external computer systems using communication protocols of both the first type and the second type.

15. The method of claim 1, wherein the first pool comprises a plurality of communication controllers.

* * * * *